United States Patent [19]

Posso

[11] 4,326,688
[45] Apr. 27, 1982

[54] PLATFORM FOR PHOTOGRAPHIC OR CINEMATOGRAPHIC STAND

[75] Inventor: Patrick Posso, Lausanne, Switzerland

[73] Assignee: Gefitec S.A., Lausanne, Switzerland

[21] Appl. No.: 85,124

[22] Filed: Oct. 15, 1979

[30] Foreign Application Priority Data

Oct. 20, 1978 [CH] Switzerland ............... 10867/78

[51] Int. Cl.³ ........................................ F16M 11/04
[52] U.S. Cl. ................................................ 248/178
[58] Field of Search ............... 248/178, 183, 184, 185

[56] References Cited

U.S. PATENT DOCUMENTS

| | | | |
|---|---|---|---|
| 1,870,766 | 8/1932 | Beistle | 248/183 |
| 2,143,606 | 1/1939 | Mooney | 248/183 |
| 2,499,066 | 2/1950 | Jacobson | 248/183 |
| 2,962,251 | 11/1960 | Karpf | 248/183 |
| 3,423,089 | 1/1969 | Andis | 248/185 X |
| 3,430,957 | 3/1969 | Andis | 248/185 X |

FOREIGN PATENT DOCUMENTS 2852034 12/1978 Fed. Rep. of Germany ...... 248/183
11752 of 1914 United Kingdom ............... 248/183

Primary Examiner—William H. Schultz
Attorney, Agent, or Firm—Shenier & O'Connor

[57] ABSTRACT

The present invention relates to a platform which comprises a turret mounted to rotate about a vertical axis with respect to foldable legs and supporting a plate fast with a shaft mounted to rotate about a horizontal axis with respect to this turret, wherein the hand lever for controlling the swivelling of the plate is foldable against the folded legs and connected to its bearing element on the platform by means of a swivelling device with built-in locking system for at least two positions of this lever.

4 Claims, 2 Drawing Figures

U.S. Patent    Apr. 27, 1982    4,326,688
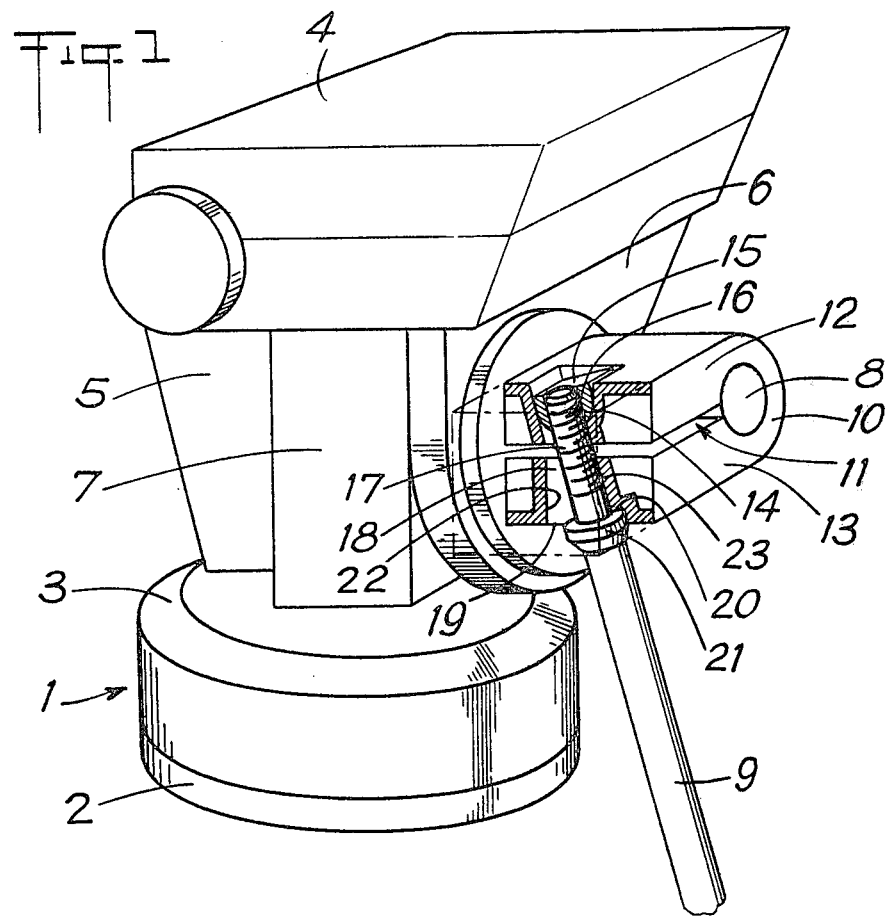
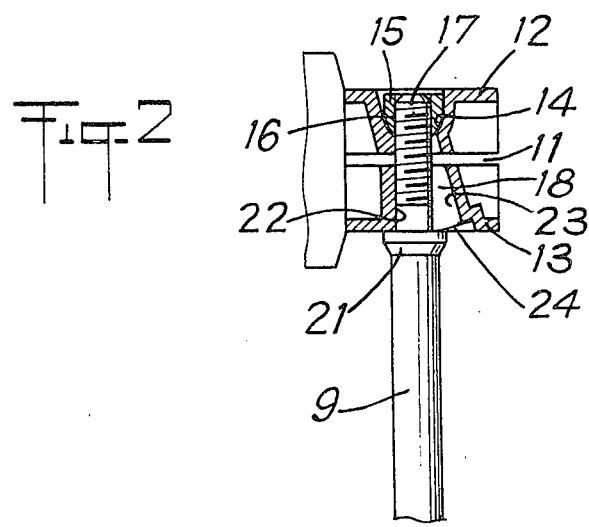

PLATFORM FOR PHOTOGRAPHIC OR CINEMATOGRAPHIC STAND

The present invention relates to a platform for a photographic or cinematographic stand.

Such a platform generally comprises a turret mounted to rotate about a vertical axis with respect to foldable legs and supporting, for the fixation of a shot taking apparatus, a plate fast with a shaft mounted to rotate about a horizontal axis with respect to this turret.

A control hand lever is connected to any one of the elements of this platform associated with the displacement of the plate and, to facilitate the bidirectional swivelling of this plate, the lever is inclined outwardly. When the legs are folded, it is very difficult to stow away as this projecting element is relatively bulky and the only possibility offered to the user is to dismantle the lever.

The assembly which will subsequently follow this dismantling is a relatively long and tedious operation, but is especially discouraging for the user who wishes to take photographs or make a film without delay.

On the other hand, the risk exists that the dismantled lever will be lost and if this happens, the stand cannot be used except under very poor conditions as long as said lever is not replaced.

Finally, these successive assemblings and dismantlings wear the equipment and seriously damage the means for fixing the lever on its bearing element, this fixation most often being effected by screwing.

It is firstly an object of the present invention to remedy these drawbacks by providing a device due to which the handling ability and availability of the platform are maintained, whilst the dimensions of the standin stowed away position are reduced, the risk of loss of the lever completely set aside and the reliability of the system increased.

To achieve the above object it is proposed that the lever be foldable against the folded legs and connected to its bearing element by means of a swivelling device with built-in locking system for at least two positions of this lever.

Within the framework of its main object as mentioned hereinabove, the present invention consequently aims at simplifying the device and rendering adjustment simpler, more rapid, more sure and more accurate without unnecessary trial and error.

To this end, it makes use of the teaching provided by U.S. Pat. No. 2,449,049 which shows, for adjusting the inclination of each leg of a cinematographic tripod, the combination of a cylindrical screen with a screw of which the stem passes through a support plate and of which the head abuts on a double-slope boss thereof. The invention therefore applies this teaching to a cinematographic platform by causing certain of the abovementioned means to cooperate with a split sleeve and by substituting the manoeuvring hand lever for the screw.

In accordance with the invention, the first arm of the split sleeve defines a cylindrical bearing surface of which the geometrical axis is substantially at right angles to that of the shaft and in which is disposed a nut shaped at least partially as a roller which presents a tapped hole perpendicular to its axis of pivoting for the screwing of the threaded end of the lever, of which the rod passes through the second arm of the split sleeve, abutting by a shoulder on an outer shaped surface thereof, the lever thus being able to pivot in a plane substantially parallel to the shaft.

The threaded end preferably passes through an elongated slot in the second arm of the sleeve, the ends of which slot constitute end-of-pivoting stops for the lever between the operational position and stowed away position. The support surface of the second arm of the sleeve presents two sides perpendicular to the operational and stowed away positions of the threaded rod of the lever.

The invention will be more readily understood on reading the following description with reference to the accompanying drawings, in which:

FIG. 1 is a perspective view showing a platform according to the invention, the improved device thereof being visualised in section for operational position, FIG. 2 is a partial section similar to FIG. 1 and illustrating the device in stowed away position.

Referring now to the drawings, the Figures show the platform which comprises a turret 1 of which the fixed seat 2 is provided with foldable legs (not shown) and supports a turntable 3 capable of rotating about a vertical axis. The platform also comprises a plate 4 adapted for the assembly of a shot taking apparatus and adapted to rotate about a horizontal axis. To this end, the lower part of the plate is fast with a fork joint of which the wings 5 and 6 are disposed on either side of a lug 7 surmounting the turntable 3; a shaft 8 with horizontal geometrical axis, integral with wings 5, 6, is mounted for slightly tight rotation through the lug 7 and projects outside one or the other of said wings.

The retracting device comprises a part adapted to be fixed on any one of the elements of the platform associated with the displacement of the plate, this part bearing a control hand lever 9 adapted to be folded against the folded legs.

In the example shown, the part is a split sleeve 10 fitted on the shaft 8; the sleeve is therefore elastically deformable due to the slot 11 which connects its bore to the outside and consequently separates two arms 12 and 13 from each other; it is observed that by bringing the arms together, the sleeve is tightened on the shaft with the result that the lever 9 which allows this movement of approach is connected to the plate and, by moving said arms apart, this sleeve is loosened and said lever is released from any rigid connection with said plate.

The lever 9 is mounted between the arms of the sleeve by means of a pivoting device with built-in locking system for at least two positions of this lever.

In the example shown, the arm 12 defines a cylindrical bearing surface 14 for receiving a nut 15 in the form of a truncated roller; the pivot axis of this roller is substantially at right angles to the axis of rotation of the shaft 8; on the other hand, the axis of the tapped hole 16 of this nut is substantially perpendicular to said pivot axis; this results in that the lever 9 of which the threaded end 17 is screwed in the tapped hole 16 of the nut, pivots in a plane substantially parallel to the axis of rotation of the shaft 8.

This threaded end 17 furthermore passes through an elongated slot 18 formed in the other arm 13 of the sleeve and opening out onto a support surface 19, 20 located outside this arm 14 to cooperate with the shoulder of a projecting flange 21 of the lever 9.

In the example shown, the ends 22, 23 of the slot 18 constitute end-of-pivoting stops for the lever 9, defining the operational position (FIG. 1) in which said lever is inclined outwardly and the shoulder of its flange 21 bears against the side 20 of the support surface of the arm 13 and, respectively, the stowed away position (FIG. 2) in which this lever is folded against the folded legs and the shoulder of its flange 21 bears against the other inclined side 19 of this support surface; the two sides 19 and 20 of the latter are inclined perpendicularly with respect to the axis of the lever when this lever occupies the two end positions mentioned above.

To stow away the handle, it must be rotated around its longitudinal axis to unscrew its threaded end 17 from the nut 15 until the shoulder of the flange 21 is separate from the side 20; it must then be pivoted until this threaded end abuts against the rounded part 22 of the slot, then brought in alignment with the folded legs by rotating the sleeve 10 about the shaft 8, and finally locked again by screwing said threaded end 17 in the nut 15 until the shoulder of the flange 21, by pressing on the side 19, tightens the sleeve 10 on the shaft 8.

Similarly, to bring the lever 9 into operational position, it suffices to loosen it, pivot it until it abuts against the rounded part 23 of the slot, swivel it by rotating the sleeve 10 about the shaft 8 and retighten it by pressing its flange 21 against the side 20.

Intermediate positions of the lever may be selected. In this case, the support surface 24 (FIG. 2) is advantageously curved concentrically with respect to the cylindrical bearing surface 14 and the state of these surfaces is advantageously rendered more adherent due to a mechanical treatment (knurling, shot-blasting . . . ) or the like.

The invention is not limited to the embodiment described and shown as various modifications may be made thereto without departing from its scope. In particular, the pivoting nut may be of another type and comprises, for example, journals mounted to pivot with respect to the arm 12. On the other hand, the swivelling device constituted by the combination of the rotating sleeve 10 with the pivoting nut 15 may be of another type, of ball and socket type, for example.

The improvement forming the subject matter of the present invention is applicable to photographic or cinematographic stands for controlling the swivelling of the shot taking apparatus.

What is claimed is:

1. In an improved platform for a photographic or cinematographic stand, comprising a turret mounted to rotate about a vertical axis with respect to foldable legs and supporting, for the fixation of a shot taking apparatus, a plate fast with a shaft mounted to rotate about a horizontal axis with respect to this turret, the shaft being provided with an outwardly inclined control hand lever for facilitating the bidirectional swivelling of the plate, foldable against the folded legs and connected to said shaft by means of a swivelling device with built-in locking system for at least two positions of this lever, which device comprises a split sleeve freely fitted over said control shaft and elastically deformable by bringing its two arms closer to each other or separating them by means of the threaded end of the lever, wherein the first arm of the split sleeve defines a cylindrical bearing surface of which the geometrical axis is substantially at right angles to that of the shaft and in which is disposed a nut shaped at least partially as a roller which presents a tapped hole perpendicular to its pivot axis for screwing the threaded end of the lever, and said lever passes through the second arm of the split sleeve and is provided with a shoulder abutting on an outer shaped surface of said second arm, the lever thus being able to pivot in a plane substantially parallel to the shaft.

2. The improved platform of claim 1, wherein the threaded end passes through an elongated slot in the second arm of sleeve, the ends of which slot constitute end-of-pivoting stops for the lever between the operational position and the stowed away position.

3. The improved platform of either one of claims 1 or 2, wherein the support surface of the second arm of the sleeve is curved concentrically with respect to the axis of the cylindrical bearing surface of the first arm.

4. The improved platform of either one of claims 1 or 2, wherein the support surface of the second arm of the sleeve presents two sides perpendicular to the operational and stowed away positions of the threaded rod of the lever.

* * * * *